United States Patent
Chen et al.

(10) Patent No.: US 11,206,302 B2
(45) Date of Patent: Dec. 21, 2021

(54) METHOD AND DEVICE FOR FEEDING BACK A RESOURCE FILE

(71) Applicant: WANGSU SCIENCE & TECHNOLOGY CO., LTD., Shanghai (CN)

(72) Inventors: Lijuan Chen, Shanghai (CN); Lipeng Wang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 503 days.

(21) Appl. No.: 16/327,668

(22) PCT Filed: Jul. 12, 2018

(86) PCT No.: PCT/CN2018/095431
§ 371 (c)(1),
(2) Date: Feb. 22, 2019

(87) PCT Pub. No.: WO2019/196225
PCT Pub. Date: Oct. 17, 2019

(65) Prior Publication Data
US 2021/0344741 A1 Nov. 4, 2021

(30) Foreign Application Priority Data
Apr. 10, 2018 (CN) .......................... 201810317282.6

(51) Int. Cl.
*H04L 29/08* (2006.01)
*H04L 9/06* (2006.01)
*G06F 16/957* (2019.01)

(52) U.S. Cl.
CPC .......... *H04L 67/06* (2013.01); *G06F 16/9574* (2019.01); *H04L 9/0643* (2013.01); *H04L 67/2828* (2013.01); *H04L 67/2842* (2013.01)

(58) Field of Classification Search
CPC .. G06F 3/0641; G06F 12/0848; G06F 3/0619; G06F 3/067; G06F 12/0875;
(Continued)

(56) References Cited

U.S. PATENT DOCUMENTS

2001/0042171 A1* 11/2001 Vermeulen .......... G06F 16/9574
711/118
2002/0143892 A1* 10/2002 Mogul ................ H04L 67/2852
709/217
(Continued)

FOREIGN PATENT DOCUMENTS

CN 102111685 A 6/2011
CN 102170479 A 8/2011
(Continued)

OTHER PUBLICATIONS

The European Patent Office (EPO) The Extended European Search Report for 18877297.4 dated Oct. 11, 2019 11 Pages.
(Continued)

*Primary Examiner* — Chirag R Patel

(57) ABSTRACT

A method includes: receiving a resource acquisition request of a target resource, and calculating resource identification information included in the resource acquisition request by using a first preset algorithm to obtain a target feature index value; if a resource file corresponding to the target feature index value exists locally, feeding back the resource file corresponding to the target feature index value, and if not, transmitting a data acquisition request of a specified segment of the target resource to a resource server of the target resource; receiving data of the specified segment fed back by the resource server, and calculating the data of the specified segment by using a second preset algorithm to obtain a target content index value; and if a resource file corresponding to the target content index value exists locally, feeding back the
(Continued)

resource file corresponding to the target content index value, and if not, transmitting the resource acquisition request to the resource server.

18 Claims, 3 Drawing Sheets

(58) Field of Classification Search
CPC ............ G06F 16/1752; G06F 16/9574; G06F 16/24552; H04L 9/0643; H04L 9/0894; H04L 67/2842; H04L 67/02; H04L 67/28; G06K 9/6215; H03M 7/3091
See application file for complete search history.

(56) References Cited

U.S. PATENT DOCUMENTS

| | | | | |
|---|---|---|---|---|
| 2006/0277459 | A1* | 12/2006 | Lemoine | G06F 40/154 715/234 |
| 2007/0192474 | A1 | 8/2007 | Decasper et al. | |
| 2009/0049243 | A1 | 2/2009 | Dubrovsky et al. | |
| 2010/0191805 | A1 | 7/2010 | Lu et al. | |
| 2013/0290462 | A1* | 10/2013 | Lim | G06F 12/0873 709/213 |
| 2013/0326154 | A1* | 12/2013 | Haswell | G06F 12/0895 711/141 |
| 2014/0072275 | A1 | 3/2014 | Nagasaka et al. | |
| 2014/0279952 | A1* | 9/2014 | Akirav | G06F 16/1748 707/692 |
| 2016/0344835 | A1 | 11/2016 | He et al. | |
| 2017/0295236 | A1* | 10/2017 | Kulkarni | H04L 67/1097 |
| 2020/0073952 | A1* | 3/2020 | Kardonik | G06F 16/2255 |

FOREIGN PATENT DOCUMENTS

| | | |
|---|---|---|
| CN | 103248684 A | 8/2013 |
| CN | 103269353 A | 8/2013 |
| CN | 104951480 A | 9/2015 |
| CN | 105915930 A | 8/2016 |
| CN | 106028154 A | 10/2016 |
| CN | 106559677 A | 4/2017 |
| CN | 107801051 A | 3/2018 |
| WO | 2012100373 A1 | 8/2012 |

OTHER PUBLICATIONS

The World Intellectual Property Organization (WIPO) International Search Report and Written Opinion for PCT/CN2018/095431 dated Jan. 9, 2019 9 Pages.
The China National Intelleectual Property Administration (CNIPA) The China Search Report for 201810317282.6 dated Nov. 5, 2019 6 Pages.
The China National Intelleectual Property Administration (CNIPA) The China Search Report for 201810317282.6 dated Jul. 29, 2020 3 Pages.

* cited by examiner

METHOD AND DEVICE FOR FEEDING BACK A RESOURCE FILE

CROSS-REFERENCES TO RELATED APPLICATIONS

This application is a national phase entry under 35 U.S.C § 371 of International Application No. PCT/CN2018/095431 filed on Jul. 12, 2018, which claims priority of Chinese Patent Application No. 2018103172826, filed with the State Intellectual Property Office of P. R. China on Apr. 10, 2018, the entire contents of all of which are incorporated herein by reference.

FIELD OF DISCLOSURE

The present disclosure generally relates to the field of data storage technology and, more particularly, relates to a method and device for feeding back a resource file.

BACKGROUND

With the continuous advancement of Internet technology, CDN (Content Delivery Network) services have also developed rapidly. A CDN service cluster includes a large number of cache servers for storing data resources, where a user may acquire a data resource stored in a nearby cache device in a short period of time.

When a user wants to obtain a certain data resource through a terminal, for instance, the user wants to watch a video or download a file, the user may transmit a resource acquisition request through the terminal. The resource acquisition request may include resource identification information, which may include feature information such as the request method, target IP (Internet Protocol) address, domain name, resource name, URL (Uniform Resource Locator), etc. After receiving the resource acquisition request, the CDN service cluster may distribute the request to a cache server. The cache server may search whether the data resource is stored locally according to the resource identification information. If the data resource is not stored locally, the cache server may acquire the data resource from a corresponding resource server, and then feed back the data resource to the terminal. At the same time, the cache server may store the data resource in the local. Accordingly, if a subsequent resource acquisition request for the same data resource is received, the cache server may directly feed back the data resource stored therein.

In the process of implementing the present disclosure, applicants have found that the existing technologies have at least the following problems:

For the same data resource, the resource identification information of different resource servers has different information formats. In order to improve the security of the data resource, some resource servers may also frequently adjust the information formats of the resource identification information. Accordingly, even multiple resource acquisition requests point to the same data resource, the resource identification information included therein is most likely to be different. For that data resource, the cache server then needs to acquire and cache multiple copies of the data resource from the resource servers. Therefore, the cache server may store a large number of duplicate data resources, and thus the cache utilization rate is low.

BRIEF SUMMARY OF THE DISCLOSURE

To solve the problems in the existing technologies, the embodiments of the present disclosure provide a method and device for feeding back a resource file. The technical solutions are as follows:

In one aspect, a method for feeding back a resource file is provided. The method includes:

receiving a resource acquisition request of a target resource, and calculating resource identification information included in the resource acquisition request by using a first preset algorithm to obtain a target feature index value;

if a resource file corresponding to the target feature index value exists locally, feeding back the resource file corresponding to the target feature index value, and if the resource file corresponding to the target feature index value does not exist locally, transmitting a data acquisition request of a specified segment of the target resource to a resource server of the target resource;

receiving data of the specified segment of the target resource fed back by the resource server, and calculating the data of the specified segment by using a second preset algorithm to obtain a target content index value; and if a resource file corresponding to the target content index value exists locally, feeding back the resource file corresponding to the target content index value, and if the resource file corresponding to the target content index value does not exist locally, transmitting the resource acquisition request of the target resource to the resource server.

Optionally, calculating the resource identification information included in the resource acquisition request by using the first preset algorithm to obtain the target feature index value includes:

if the resource identification information included in the resource acquisition request matches a locally pre-stored target information format, extracting feature information in the resource identification information according to the locally pre-stored target information format, and calculating the feature information by using the first preset algorithm to obtain the target feature index value; and if the resource identification information included in the resource acquisition request does not match any locally pre-stored information format, calculating the resource identification information included in the resource acquisition request by using the first preset algorithm to obtain the target feature index value.

Optionally, transmitting the data acquisition request of the specified segment of the target resource to the resource server of the target resource includes:

if a data size of a resource file of the target resource is larger than a data size of the specified segment, transmitting the data acquisition request of the specified segment of the target resource to the resource server of the target resource, and if the data size of the resource file of the target resource is not larger than the data size of the specified segment, transmitting the resource acquisition request of the target resource to the resource server.

Optionally, calculating the data of the specified segment by using the second preset algorithm to obtain the target content index value includes:

obtaining a data size of a whole resource in which the target resource is included, and combining the data size of the whole resource to calculate the data of the specified segment by using the second preset algorithm to obtain the target content index value.

Optionally, the resource acquisition request includes identifiers for target data segments; and if the resource file corresponding to the target content index value exists locally, feeding back the resource file corresponding to the target content index value includes:

if the resource file corresponding to the target content index value exists locally, and the resource file includes all resource data to which the identifiers of the target data segments are directed, feeding back all the resource data, in the resource file, to which the identifiers of the target data segments are directed, and if the resource file corresponding to the target content index value exists locally, and the resource file does not include all the resource data to which the identifiers of the target data segments are directed, transmitting the resource acquisition request of the target resource to the resource server.

Optionally, after transmitting the resource acquisition request of the target resource to the resource server, the method further includes:

receiving a resource file of the target resource fed back by the resource server, and correspondingly storing the target feature index value, the target content index value, and the resource file in the local.

In another aspect, a device for feeding back a resource file is provided. The device includes:

a first calculation module that is configured to receive a resource acquisition request of a target resource, and calculate resource identification information included in the resource acquisition request by using a first preset algorithm to obtain a target feature index value;

a first transmission module that is configured to, if a resource file corresponding to the target feature index value exists locally, feed back the resource file corresponding to the target feature index value, and if the resource file corresponding to the target feature index value does not exist locally, transmit a data acquisition request of a specified segment of the target resource to a resource server of the target resource;

a second calculation module that is configured to receive data of the specified segment of the target resource fed back by the resource server, and calculate the data of the specified segment by using a second preset algorithm to obtain a target content index value; and a second transmission module that is configured to, if a resource file corresponding to the target content index value exists locally, feed back the resource file corresponding to the target content index value, and if the resource file corresponding to the target content index value does not exist locally, transmit the resource acquisition request of the target resource to the resource server.

Optionally, the first calculation module is specifically configured to:

if the resource identification information included in the resource acquisition request matches a locally pre-stored target information format, extract feature information in the resource identification information according to the locally pre-stored target information format, and calculate the feature information by using the first preset algorithm to obtain the target feature index value; and if the resource identification information included in the resource acquisition request does not match any locally pre-stored information format, calculate the resource identification information included in the resource acquisition request by using the first preset algorithm to obtain the target feature index value.

Optionally, the first transmission module is specifically configured to:

if a data size of a resource file of the target resource is larger than a data size of the specified segment, transmit the data acquisition request of the specified segment of the target resource to the resource server of the target resource, and if the data size of the resource file of the target resource is not larger than the data size of the specified segment, transmit the resource acquisition request of the target resource to the resource server.

Optionally, the second calculation module is specifically configured to:

obtain a data size of a whole resource in which the target resource is included, and combine the data size of the whole resource to calculate the data of the specified segment by using the second preset algorithm to obtain the target content index value.

Optionally, the resource acquisition request includes identifiers for target data segments; and the second transmission module is specifically configured to:

if the resource file corresponding to the target content index value exists locally, and the resource file includes all resource data to which the identifiers of the target data segments are directed, feed back all the resource data, in the resource file, to which the identifiers of the target data segments are directed, and if the resource file corresponding to the target content index value exists locally, and the resource file does not include all the resource data to which the identifiers of the target data segments are directed, transmit the resource acquisition request of the target resource to the resource server.

Optionally, the device further includes:

a storage module that is configured to receive a resource file of the target resource fed back by the resource server, and correspondingly store the target feature index value, the target content index value, and the resource file in the local.

In another aspect, a cache server is provided. The cache server includes a processor and a memory, where the memory stores at least one instruction, at least one program, a code set, or an instruction set. The at least one instruction, at least one program, a code set, or an instruction set is loaded and executed by the processor to implement the above-described methods for feeding back a resource file.

In another aspect, a computer-readable storage medium is provided. The computer-readable storage medium stores at least one instruction, at least one program, a code set, or an instruction set. The at least one instruction, at least one program, a code set, or an instruction set is loaded and executed by the processor to implement the above-described methods for feeding back a resource file.

The beneficial effects brought by the technical solutions provided by the embodiments of the present disclosure include:

In the embodiments of the present disclosure, the resource acquisition request of a target resource is received, and the resource identification information included in the resource acquisition request is calculated by using a first preset algorithm to obtain a target feature index value. If the resource file corresponding to the target feature index value exists locally, the resource file corresponding to the target feature index value is fed back. If the resource file corresponding to the target feature index value does not exist locally, a data acquisition request of a specified segment of the target resource is transmitted to the resource server of the target resource. The data of the specified segment of the target resource fed back by the resource server is received, and the data of the specified segment is calculated by using a second preset algorithm to obtain a target content index value. If the resource file corresponding to the target content index value exists locally, the resource file corresponding to the target content index value is fed back. If the resource file corresponding to the target content index value does not exist locally, the resource acquisition request of the target resource is transmitted to the resource server. In this way, after receiving a resource acquisition request, the cache server first matches the corresponding resource file by using the feature index value. If the corresponding resource file exists locally, the corresponding resource file may be directly fed back. If the corresponding resource file does not exist locally, the content index value is used as a basis to determine whether the corresponding resource file exists locally, where the content index value is calculated based on the data of a specified segment of the target resource. Since the data of the specified segment is fixed, the problem of not being able to match the corresponding resource in the local due to the difference in the resource identification information and the subsequent multiple backing-to-source and caching of the same data resource may be avoided to some extent. This not only reduces the storage repetition rate of a data resource, improves the cache utilization rate, but also improves the speed of feeding back a resource file.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the present disclosure will be made in detail hereinafter with reference to the accompanying drawings.

The embodiments of the present disclosure provide a method for feeding back a resource file. The execution entity of the method may be a cache server, which may be a server for storing data resources in a CDN service cluster. In a scenario of the entire network, a plurality of cache servers may be deployed in the same geographical area, where each cache server is respectively configured to store different data resources. The plurality of cache servers may be connected to a distributor in the CDN service cluster. The distributor may be configured to receive a resource acquisition request sent by a terminal, and distribute the resource acquisition request to a corresponding cache server according to the policies such as the resource uniqueness, load balance, and proximity-based service. A cache server may be also connected to a resource server. When the resource file of a data resource needs to be acquired, the cache server may download the resource file from the corresponding resource server, and locally store the resource file.

Figure 1:
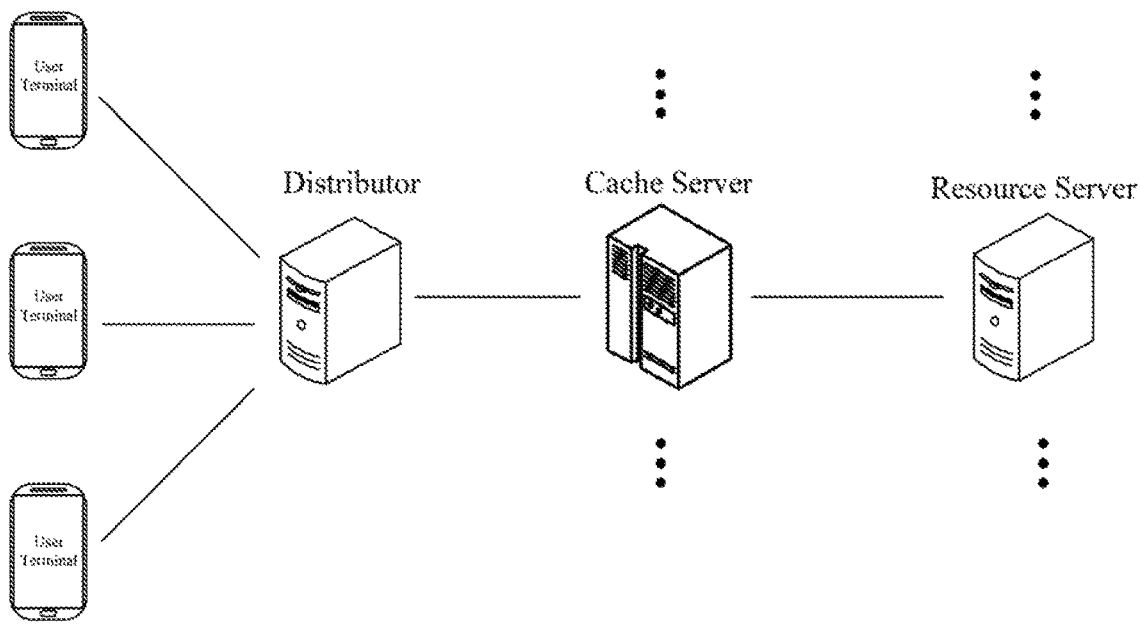
FIG. 1 is a schematic diagram of a scenario framework for feeding back a resource file according to some embodiments of the present disclosure.

A scenario framework of the CDN service cluster may be as shown in FIG. 1. The cache server may include a processor, a memory, and a transceiver. The processor may be configured to process a resource file-feeding back in the following process. The memory may be configured to store data required and generated in the following process, and the transceiver may be configured to transmit and receive relevant data in the following process.

Figure 2:
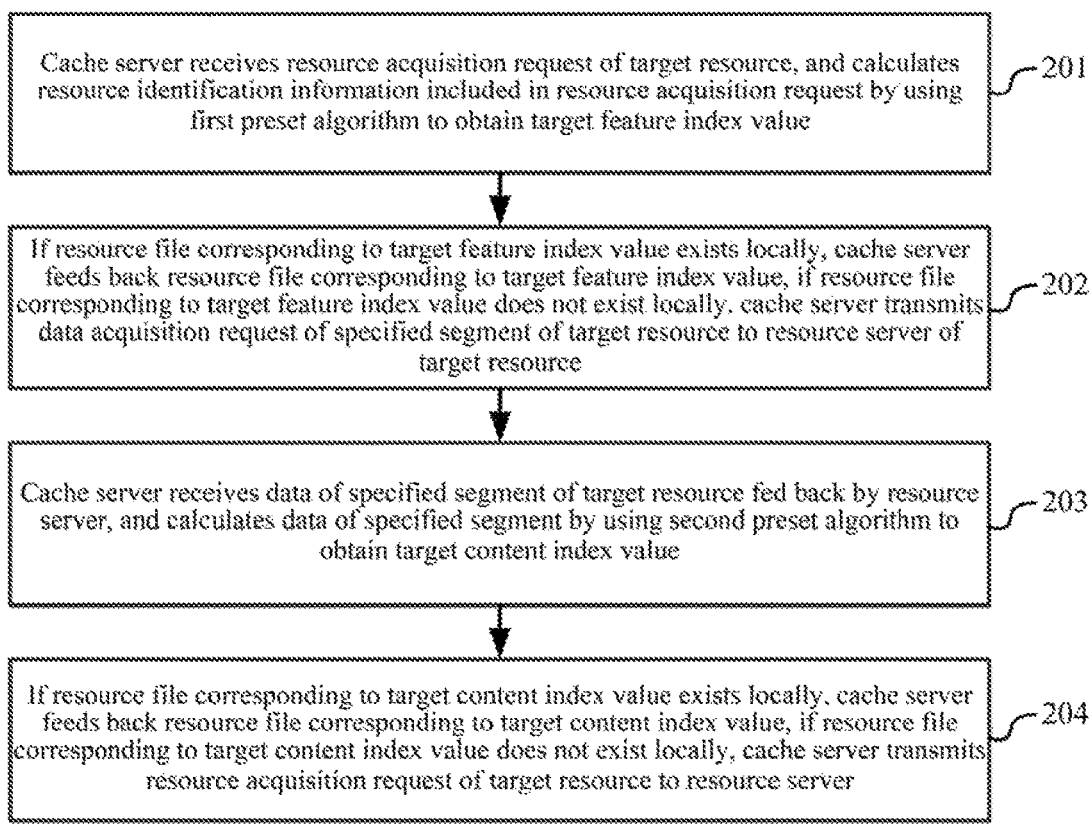
FIG. 2 is a flowchart of a method for feeding back a resource file according to some embodiments of the present disclosure.

The flowchart shown in FIG. 2 will be made in detail hereinafter in conjunction with specific implementations. The content may be as follows:

Step 201: The cache server receives a resource acquisition request of a target resource, and calculates resource identification information included in the resource acquisition request by using a first preset algorithm to obtain a target feature index value.

In one implementation, when a user wants to acquire a certain data resource (i.e., a target resource) through a terminal, for instance, the user wants to watch a video or download a file, the user may send a resource acquisition request of the target resource via the terminal. The distributor of the CDN service cluster may receive the resource acquisition request, and then determine a target resource to which the resource acquisition request is directed. Afterwards, the distributor may select a cache server according to the attribute information of the terminal and the target resource, for instance, select a cache server that serves the area where the terminal is located, and/or select a cache server that has established a communication connection with the resource server of the target resource. The distributor may then transmit the above resource acquisition request to the selected cache server. In this way, the cache server may receive the resource acquisition request of the target resource, and then read the resource identification information included in the resource acquisition request, where the resource identification information may be used to search and identify the target resource. Next, the cache server may calculate the resource identification information by using a first preset algorithm to obtain a unique target feature index value. Here, the first preset algorithm may be an MD5 (Message-Digest Algorithm 5) algorithm.

Optionally, the feature information in the resource identification information may be extracted first, and then the feature index value is calculated based on the feature information. Correspondingly, the process in Step 201 may be as follows: if the resource identification information included in the resource acquisition request matches a locally pre-stored target information format, the cache server extracts the feature information in the resource identification information according to the target information format, and calculates the feature information to get the target feature index value by using the first preset algorithm; if the resource identification information included in the resource acquisition request does not match any locally pre-stored information format, the cache server calculates the target feature index value based on the resource identification information included in the resource acquisition request by using the first preset algorithm.

In one implementation, the technical staff on the cache server side may analyze in advance the resource identification information corresponding to the data resources, and then summarize and generalize the uniform information formats of some resource identification information, and store the information formats in the cache server. The information formats may be similar to: the total number of bytes is 30-40 bytes, including 4 parts, the first 4 bytes record the request method, the following 8 bytes are the domain name, and the last 10 bytes are the URL. In this way, after receiving the resource acquisition request of a target resource, the cache server may determine whether the resource identification information included in the resource acquisition request matches a locally pre-stored information format. If the resource identification information matches a target information format, the cache server may extract the feature information included in the resource identification information according to the target information format, and then calculate the feature information by using the first preset algorithm to obtain the target feature index value. If the resource identification information does not match any pre-stored information format, the cache server may directly calculate the entire resource identification information by using the first preset algorithm to obtain the target feature index value. It is to be understood that the information formats of the resource identification information corresponding to the data resources of each type of resource server or the data resources under each type of resource format (e.g., video, document, picture) are very likely to be consistent. Therefore, the technical staff may group data resources based on the resource server and/or the resource format, and then set one or more information formats for each group. In this way, for the resource acquisition request of a target resource, after obtaining the resource identification information, the cache server may first determine the group to which the target resource belongs, and then determine whether the resource identification information matches a certain information format corresponding to that group. It is to be understood that although the resource identification information may change in format, the feature information contained therein is relatively fixed. Accordingly, through extracting the feature information in the resource identification information, the target feature index value calculated based on the feature information will not change due to the change of the format of the resource identification information, and thus is more accurate.

Step 202: If the resource file corresponding to the target feature index value exists locally, the cache server feeds back the resource file corresponding to the target feature index value; and if the resource file corresponding to the target feature index value does not exist locally, the cache server transmits the data acquisition request of a specified segment of the target resource to the resource server of the target resource.

In one implementation, when storing the resource file of each data resource, the cache server also stores the corresponding feature index value and the content index value. The feature index value may be calculated by using the method for calculating the target feature index value. At the same time, the cache server may acquire the resource data of a specified segment of the resource file, and then calculate the resource data of the specified segment by using a second preset algorithm to generate a content index value of the resource file. The cache server may then store the feature index value, the content index value, and the resource file correspondingly. Specifically, the cache server may create a resource storage directory that correspondingly records the storage addresses of the feature index value, the content index value, and the resource file. In this way, after calculating the target feature index value of the target resource, the cache server may search the resource storage directory to check whether there is a feature index value in the local that is the same as the target feature index value. If there is a feature index value in the local that is the same as the target feature index value, the cache server may feed back the resource file corresponding to the feature index value through the distributor to the terminal. If there is no feature index value in the local that is the same as the target feature index value, the cache server may transmit a data acquisition request of the specified segment of the target resource to the resource server of the target resource. Here, the specified segment may be pre-set by the technical staff of the CDN service cluster and written into the cache server, and is applicable to the resource files of all data resources. The specified segment may be the header fragment of the first N bytes of length in each resource file.

It should be noted that, based on the foregoing process that the resource identification information matches the pre-stored information format, if the target feature index value is calculated according to the feature information, in some cases, if the resource file corresponding to the target feature index value does not exist locally, it may mean that the corresponding resource file really is not stored locally. The cache server may then transmit the resource acquisition request of the target resource directly to the resource server of the target resource.

Optionally, for some resource files that have a small data size, the resource server does not need to transmit a data acquisition request of the specified segment. Correspondingly, the process of Step 202 may be as follows: if the data size of the resource file of the target resource is larger than the data size of the specified segment, the cache server transmits the data acquisition request of the specified segment of the target resource to the resource server of the target resource; and if the data size of the resource file of the target resource is not larger than the data size of the specified segment, the cache server transmits the resource acquisition request of the target resource to the resource server.

In one implementation, before the cache server transmits the data acquisition request of the specified segment of a target resource to the resource server of the target resource, the cache server may determine the data size of the resource file of the target resource in the current request. If the data size of the resource file is larger than the data size of the specified segment, the cache server may transmit the data acquisition request of the specified segment of the target resource to the resource server of the target resource. If the resource file of the target resource is a small file whose data size is smaller than the data size of the specified segment, or a partial resource under the resume from breakpoint mode whose data size is smaller than the data size of the specified fragment, the cache server may transmit the resource acquisition request of the target resource directly to the resource server. In this way, for the request of a resource with a data size smaller than that of the specified segment, feeding back may be directly performed, thereby improving the feeding back speed.

Step 203: The cache server receives the data of the specified segment of the target resource fed back by the resource server, and calculates the data of the specified segment by using the second preset algorithm to obtain the target content index value.

In one implementation, after receiving the data acquisition request of the specified segment of the target resource transmitted by the cache server, the resource server of the target resource may feed back the data of the specified segment of the corresponding target resource to the cache server. After receiving the data of the specified fragment, the cache server may calculate the data of the specified fragment by using the second preset algorithm to obtain the target content index value. It should be noted that the second preset algorithm may be the same as the first preset algorithm in Step 201, or may be different, but the key point of the algorithm is the uniqueness of the calculation results. That is, the calculation result of the same input is the same, and the calculation results of different inputs are different.

Optionally, the content index value may be calculated according to the size of the whole resource. Specifically, the process of Step 203 may be as follows: the cache server obtains the data size of a whole resource in which the target resource is included, and combines the data size of the whole resource to calculate the data of the specified segment by using the second preset algorithm to obtain the target content index value.

In one implementation, in the message fed back when the resource server of the target resource transmits the data of the specified segment to the cache server, the data size of a whole resource in which the target resource is included may be reported. Accordingly, before calculating the target content index value, the cache server may first obtain the data size of the whole resource, and then combine the data size of the whole resource to calculate the data of the specified fragment fed back by the resource server by using the second preset algorithm to obtain the target content index value. Further, besides the data size of the whole resource, the target content index value may be calculated in combination with other attribute information of the target resource included in the fed back message. It is to be understood that no matter what kind of processing is used, the way of calculating the target content index value here should be consistent with the way in which the content index value stored in the cache server is calculated.

Step 204: If the resource file corresponding to the target content index value exists locally, the cache server feeds back the resource file corresponding to the target content index value, and if the resource file corresponding to the target content index value does not exist locally, the cache server transmits the resource acquisition request of the target resource to the resource server.

In one implementation, after calculating the target content index value of the target resource, the cache server may look up the resource storage directory to check whether there is a content index value that is the same as the target content index value in the local. If there is a content index value that is the same as the target content index value in the local, the cache server may feed back the resource file corresponding to the content index value through the distributor to the terminal. If there is no content index value that is the same as the target content index value in the local, the cache server may transmit the resource acquisition request of the target resource to the resource server of the target resource. Afterwards, the cache server may feed back the resource file of the target resource transmitted by the resource server through the distributor to the terminal. Further, after receiving the resource file of the target resource fed back by the resource server, the cache server correspondingly stores the target feature index value, the target content index value, and the resource file in the local.

Optionally, a user may request resource data for only partial data segments, and thus the resource acquisition request may include the identifiers for target data segments. Correspondingly, the process of Step 204 may be as follows: if the resource file corresponding to the target content index value exists locally, and the resource file includes all the resource data to which the identifiers of the target data segments are directed, the cache server feeds back all the resource data, in the resource file, to which the identifiers of the target data segments are directed; if the resource file corresponding to the target content index value exists locally, and the resource file does not include all the resource data to which the identifiers of the target data segments are directed, the cache server transmits the resource acquisition request of the target resource to the resource server.

In one implementation, the cache server may obtain the identifiers for the target data segments included in the received resource acquisition request of the target resource. In this way, if the resource file corresponding to the locally stored target content index value is found, the cache server may determine whether the resource file includes all the resource data to which the identifiers of the target data segments are directed. If the resource file includes all the resource data to which the identifiers of the target data segments are directed, the cache server may feed back all the resource data to which the identifiers of the target data segments are directed. If the resource file does not include all the resource data to which the identifiers of the target data segments are directed, the cache server may transmit the resource acquisition request of the target resource to the resource server. In response, the resource server may feed back all the resource data, to which the identifiers of the target data segments are directed, of the target resource to the cache server. Afterwards, the cache server may feed back the corresponding resource data to the terminal, and add the resource data to the foregoing resource file corresponding to the target content index value. It should be noted that the foregoing process is also applicable to the process of feeding back the resource file corresponding to the target feature index value in Step 202, and the specific steps are basically the same, details of which will not be described again in the disclosed embodiments.

In the embodiments of the present disclosure, the resource acquisition request of a target resource is received, and the resource identification information included in the resource acquisition request is calculated by using a first preset algorithm to obtain a target feature index value. If the resource file corresponding to the target feature index value exists locally, the resource file corresponding to the target feature index value is fed back. If the resource file corresponding to the target feature index value does not exist locally, a data acquisition request of a specified segment of the target resource is transmitted to the resource server of the target resource. The data of the specified segment of the target resource fed back by the resource server is received, and the data of the specified segment is calculated by using a second preset algorithm to obtain a target content index value. If the resource file corresponding to the target content index value exists locally, the resource file corresponding to the target content index value is fed back. If the resource file corresponding to the target content index value does not exist locally, the resource acquisition request of the target resource is transmitted to the resource server. In this way, after receiving a resource acquisition request, the cache server first matches the corresponding resource file by using the feature index value. If the corresponding resource file exists locally, the corresponding resource file may be directly fed back. If the corresponding resource file does not exist locally, the content index value is used as a basis to determine whether the corresponding resource file exists locally, where the content index value is calculated based on the data of a specified segment of the target resource. Since the data of the specified segment is fixed, the problem of not being able to match the corresponding resource in the local due to the difference in the resource identification information and the subsequent multiple backing-to-source and caching of the same data resource may be avoided to some extent. This not only reduces the storage repetition rate of a data resource, improves the cache utilization rate, but also improves the speed of feeding back a resource file.

Figure 3:
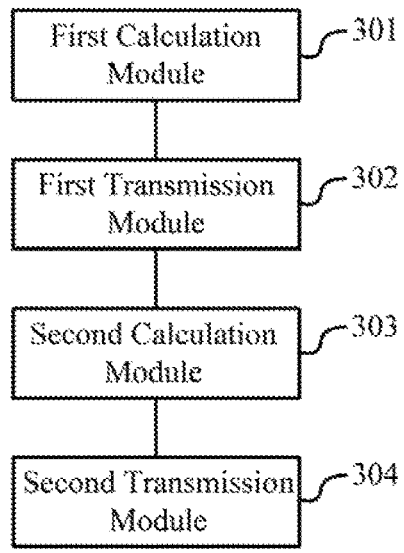
FIG. 3 is a schematic structural diagram of a device for feeding back a resource file according to some embodiments of the present disclosure.

Based on the similar technical concept, the embodiments of the present disclosure further provide a device for feeding back a resource file. As shown in FIG. 3, the device includes:

a first calculation module 301 that is configured to receive a resource acquisition request of a target resource, and calculate resource identification information included in the resource acquisition request by using a first preset algorithm to obtain a target feature index value;

a first transmission module 302 that is configured to, if a resource file corresponding to the target feature index value exists locally, feed back the resource file corresponding to the target feature index value, and if the resource file corresponding to the target feature index value does not exist locally, transmit a data acquisition request of a specified segment of the target resource to a resource server of the target resource;

a second calculation module 303 that is configured to receive data of the specified segment of the target resource fed back by the resource server, and calculate the data of the specified segment by using a second preset algorithm to obtain a target content index value;

and a second transmission module 304 that is configured to, if a resource file corresponding to the target content index value exists locally, feed back the resource file corresponding to the target content index value, and if the resource file corresponding to the target content index value does not exist locally, transmit the resource acquisition request of the target resource to the resource server.

Optionally, the first calculation module 301 is specifically configured to:

if the resource identification information included in the resource acquisition request matches a locally pre-stored target information format, extract feature information in the resource identification information according to the locally pre-stored target information format, and calculate the feature information by using the first preset algorithm to obtain the target feature index value; and if the resource identification information included in the resource acquisition request does not match any locally pre-stored information format, calculate the resource identification information included in the resource acquisition request by using the first preset algorithm to obtain the target feature index value.

Optionally, the first transmission module 302 is specifically configured to:

if a data size of a resource file of the target resource is larger than a data size of the specified segment, transmit the data acquisition request of the specified segment of the target resource to the resource server of the target resource, and if the data size of the resource file of the target resource is not larger than the data size of the specified segment, transmit the resource acquisition request of the target resource to the resource server.

Optionally, the second calculation module 303 is specifically configured to:

obtain a data size of a whole resource in which the target resource is included, and combine the data size of the whole resource to calculate the data of the specified segment by using the second preset algorithm to obtain the target content index value.

Optionally, the second transmission module 304 is specifically configured to:

if there are a plurality of resource files corresponding to the target content index value in the local, feed back a target resource file, in the plurality of resource files, whose feature information shares the highest similarity with the resource identification information.

Optionally, the resource acquisition request includes identifiers for target data segments; and the second transmission module 304 is specifically configured to:

if the resource file corresponding to the target content index value exists locally, and the resource file includes all resource data to which the identifiers of the target data segments are directed, feed back all the resource data, in the resource file, to which the identifiers of the target data segments are directed, and if the resource file corresponding to the target content index value exists locally, and the resource file does not include all the resource data to which the identifiers of the target data segments are directed, transmit the resource acquisition request of the target resource to the resource server.

Figure 4:
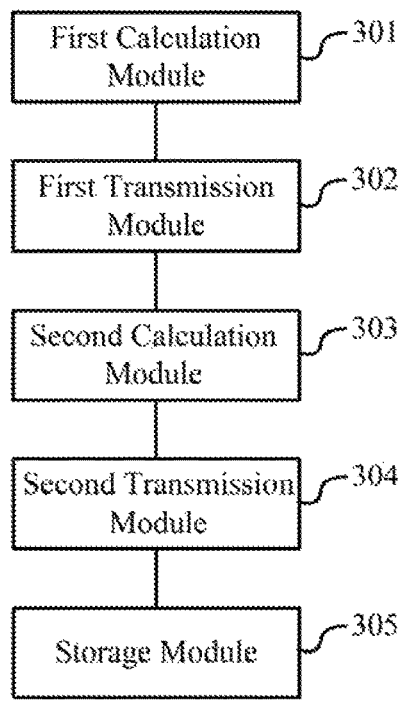
FIG. 4 is a schematic structural diagram of another device for feeding back a resource file according to some embodiments of the present disclosure.

Optionally, as shown in FIG. 4, the device further includes:

a storage module 305 that is configured to receive a resource file of the target resource fed back by the resource server, and correspondingly store the target feature index value, the target content index value, and the resource file in the local.

In the embodiments of the present disclosure, the resource acquisition request of a target resource is received, and the resource identification information included in the resource acquisition request is calculated by using a first preset algorithm to obtain the target feature index value. If the resource file corresponding to the target feature index value exists locally, the resource file corresponding to the target feature index value is fed back. If the resource file corresponding to the target feature index value does not exist locally, a data acquisition request of a specified segment of the target resource is transmitted to the resource server of the target resource. The data of the specified segment of the target resource fed back by the resource server is received, and the data of the specified segment is calculated by using a second preset algorithm to obtain a target content index value. If the resource file corresponding to the target content index value exists locally, the resource file corresponding to the target content index value is fed back. If the resource file corresponding to the target content index value does not exist locally, the resource acquisition request of the target resource is transmitted to the resource server. In this way, after receiving a resource acquisition request, the cache server first matches the corresponding resource file by using the feature index value. If the corresponding resource file exists locally, the corresponding resource file may be directly fed back. If the corresponding resource file does not exist locally, the content index value is used as a basis to determine whether the corresponding resource file exists locally, where the content index value is calculated based on the data of a specified segment of the target resource. Since the data of the specified segment is fixed, the problem of not being able to match the corresponding resource in the local due to the difference in the resource identification information and the subsequent multiple backing-to-source and caching of the same data resource may be avoided to some extent. This not only reduces the storage repetition rate of a data resource, improves the cache utilization rate, but also improves the speed of feeding back a resource file.

It should be noted that, in feeding back a resource file, the device for feeding back the resource file provided by the above embodiments is illustrated merely by way of example of the foregoing division of the functional modules. In real applications, the foregoing functions may be allocated into and implemented by different functional modules according to the needs. That is, the internal structure of the device may be divided into different functional modules to complete all or part of the above-described functions. In addition, the devices for feeding back a resource file and the methods for feeding back a file provided by the foregoing embodiments are attributed to the same concept. Accordingly, for the specific implementation process of the devices provided by the embodiments, the embodiments for the methods may be referred to, details of which will not be described again here.

Figure 5:
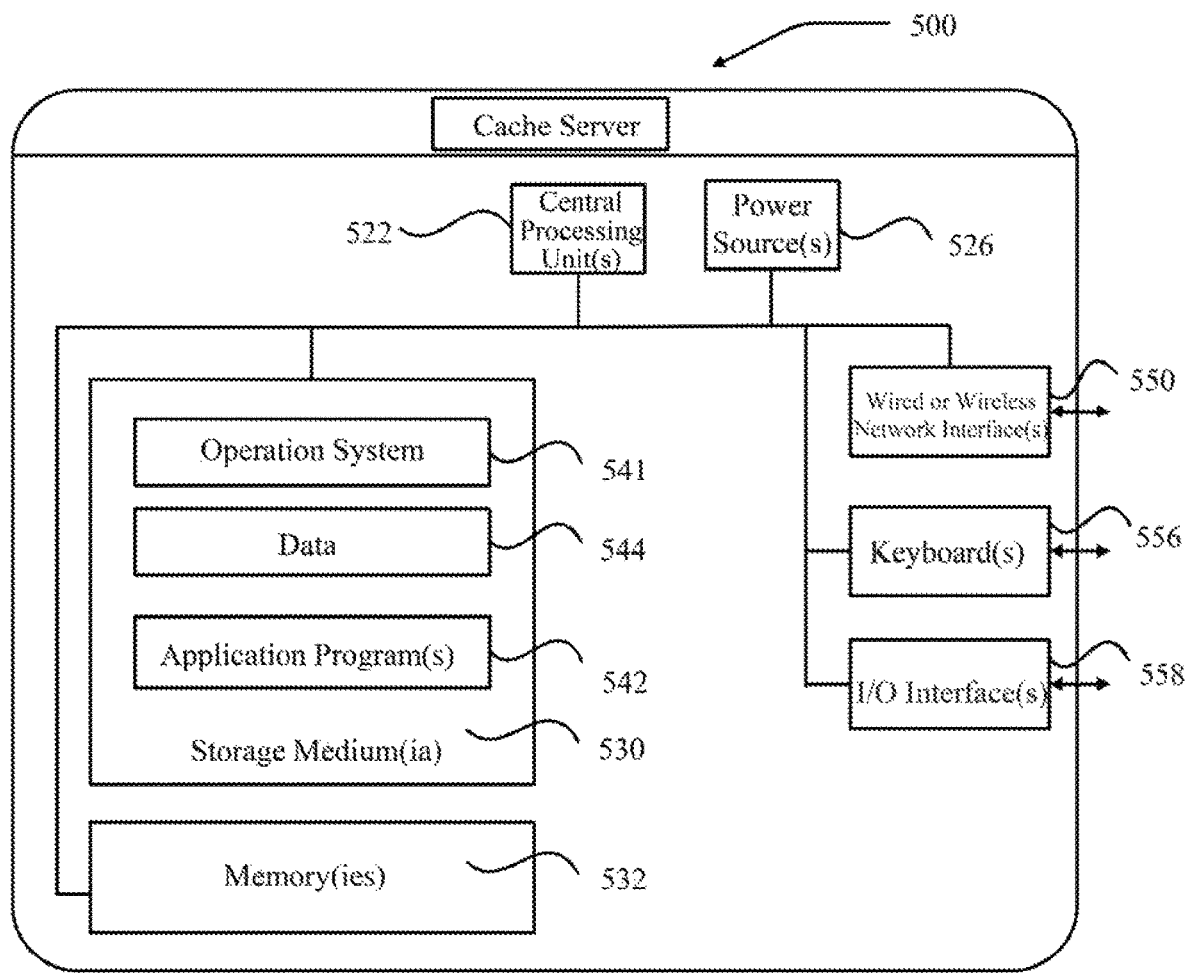
FIG. 5 is a schematic structural diagram of a cache server according to some embodiments of the present disclosure.

FIG. 5 is a schematic structural diagram of a cache server according to some embodiments of the present disclosure. The cache server 500 may vary considerably depending on the configuration or performance, and may include one or more central processing units 522 (e.g., one or more processors) and memories 532, one or more storage media 530 (e.g., one or one mass storage devices) for storing application programs 542 or data 544. Here, the memories 532 and the storage media 530 may be a volatile storage device or a non-volatile storage device. The programs stored on the storage media 530 may include one or more modules (not shown), each of which may include a series of operating instructions for the cache server. Further, the central processing units 522 may be configured to communicate with the storage media 530, and execute, on the cache server 500, a series of operating instructions stored in the storage media 530.

The cache server 500 may further include one or more power sources 526, one or more wired or wireless network interfaces 550, one or more input and output interfaces 558, one or more keyboards 556, and/or one or more operating systems 541, such as Windows Server™, Mac OS X™, Unix™, Linux™, FreeBSD™, and the like.

The cache server 500 may include a memory and one or more programs, where the one or more programs are stored in the memory and configured to be executed by one or more processors. The one or more programs include instructions that are configured to implement a resource file feeding back as described above.

A person skilled in the art may understand that all or part of the steps of the above embodiments may take the form of hardware implementation or the form of implementation of programs for instructing relevant hardware. The programs may be stored in a computer-readable storage medium. The storage medium may be a read-only memory, a magnetic disk, or an optical disk, etc.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for feeding back a resource file, comprising:
receiving a resource acquisition request of a target resource, and calculating resource identification information included in the resource acquisition request by using a first preset algorithm to obtain a target feature index value;
if a resource file corresponding to the target feature index value exists locally, feeding back the resource file corresponding to the target feature index value, and if the resource file corresponding to the target feature index value does not exist locally, transmitting a data acquisition request of a specified segment of the target resource to a resource server of the target resource;
receiving data of the specified segment of the target resource fed back by the resource server, and calculating the data of the specified segment by using a second preset algorithm to obtain a target content index value; and
if a resource file corresponding to the target content index value exists locally, feeding back the resource file corresponding to the target content index value, and if the resource file corresponding to the target content index value does not exist locally, transmitting the resource acquisition request of the target resource to the resource server.

2. The method according to claim 1, wherein calculating the resource identification information included in the resource acquisition request by using the first preset algorithm to obtain the target feature index value further includes:
if the resource identification information included in the resource acquisition request matches a locally pre-stored target information format, extracting feature information in the resource identification information according to the locally pre-stored target information format, and calculating the feature information by using the first preset algorithm to obtain the target feature index value; and
if the resource identification information included in the resource acquisition request does not match any locally pre-stored information format, calculating the resource identification information included in the resource acquisition request by using the first preset algorithm to obtain the target feature index value.

3. The method according to claim 1, wherein transmitting the data acquisition request of the specified segment of the target resource to the resource server of the target resource further includes:
if a data size of a resource file of the target resource is larger than a data size of the specified segment, transmitting the data acquisition request of the specified segment of the target resource to the resource server of the target resource, and if the data size of the resource file of the target resource is not larger than the data size of the specified segment, transmitting the resource acquisition request of the target resource to the resource server.

4. The method according to claim 1, wherein calculating the data of the specified segment by using the second preset algorithm to obtain the target content index value further includes:
obtaining a data size of a whole resource in which the target resource is included, and combining the data size of the whole resource to calculate the data of the specified segment by using the second preset algorithm to obtain the target content index value.

5. The method according to claim 1, wherein:
the resource acquisition request includes identifiers for target data segments; and if the resource file corresponding to the target content index value exists locally, feeding back the resource file corresponding to the target content index value further includes:

if the resource file corresponding to the target content index value exists locally, and the resource file includes all resource data to which the identifiers of the target data segments are directed, feeding back all the resource data, in the resource file, to which the identifiers of the target data segments are directed, and if the resource file corresponding to the target content index value exists locally, and the resource file does not include all the resource data to which the identifiers of the target data segments are directed, transmitting the resource acquisition request of the target resource to the resource server.

6. The method according to claim 1, after transmitting the resource acquisition request of the target resource to the resource server, the method further includes:

receiving a resource file of the target resource fed back by the resource server, and correspondingly storing the target feature index value, the target content index value, and the resource file in the local.

7. A device for feeding back a resource file, comprising:
a first calculation module that is configured to receive a resource acquisition request of a target resource, and calculate resource identification information included in the resource acquisition request by using a first preset algorithm to obtain a target feature index value;
a first transmission module that is configured to, if a resource file corresponding to the target feature index value exists locally, feed back the resource file corresponding to the target feature index value, and if the resource file corresponding to the target feature index value does not exist locally, transmit a data acquisition request of a specified segment of the target resource to a resource server of the target resource;
a second calculation module that is configured to receive data of the specified segment of the target resource fed back by the resource server, and calculate the data of the specified segment by using a second preset algorithm to obtain a target content index value; and
a second transmission module that is configured to, if a resource file corresponding to the target content index value exists locally, feed back the resource file corresponding to the target content index value, and if the resource file corresponding to the target content index value does not exist locally, transmit the resource acquisition request of the target resource to the resource server.

8. The device according to claim 7, wherein the first calculation module is further configured to:
if the resource identification information included in the resource acquisition request matches a locally pre-stored target information format, extract feature information in the resource identification information according to the locally pre-stored target information format, and calculate the feature information by using the first preset algorithm to obtain the target feature index value; and
if the resource identification information included in the resource acquisition request does not match any locally pre-stored information format, calculate the resource identification information included in the resource acquisition request by using the first preset algorithm to obtain the target feature index value.

9. The device according to claim 7, wherein the first transmission module is further configured to:
if a data size of a resource file of the target resource is larger than a data size of the specified segment, transmit the data acquisition request of the specified segment of the target resource to the resource server of the target resource, and if the data size of the resource file of the target resource is not larger than the data size of the specified segment, transmit the resource acquisition request of the target resource to the resource server.

10. The device according to claim 7, wherein the second calculation module is further configured to:
obtain a data size of a whole resource in which the target resource is included, and combine the data size of the whole resource to calculate the data of the specified segment by using the second preset algorithm to obtain the target content index value.

11. The device according to claim 7, wherein:
the resource acquisition request includes identifiers for target data segments; and
the second transmission module is further configured to:
if the resource file corresponding to the target content index value exists locally, and the resource file includes all resource data to which the identifiers of the target data segments are directed, feed back all the resource data, in the resource file, to which the identifiers of the target data segments are directed, and
if the resource file corresponding to the target content index value exists locally, and the resource file does not include all the resource data to which the identifiers of the target data segments are directed, transmit the resource acquisition request of the target resource to the resource server.

12. The device according to claim 7, further comprising:
a storage module that is configured to receive a resource file of the target resource fed back by the resource server, and correspondingly store the target feature index value, the target content index value, and the resource file in the local.

13. A cache server, comprising a processor and a memory, wherein the memory stores at least one instruction, at least one program, a code set, or an instruction set, that is loaded and executed by the processor to implement a method for feeding back a resource file, and the method includes:
receiving a resource acquisition request of a target resource, and calculating resource identification information included in the resource acquisition request by using a first preset algorithm to obtain a target feature index value;
if a resource file corresponding to the target feature index value exists locally, feeding back the resource file corresponding to the target feature index value, and if the resource file corresponding to the target feature index value does not exist locally, transmitting a data acquisition request of a specified segment of the target resource to a resource server of the target resource;
receiving data of the specified segment of the target resource fed back by the resource server, and calculating the data of the specified segment by using a second preset algorithm to obtain a target content index value; and
if a resource file corresponding to the target content index value exists locally, feeding back the resource file corresponding to the target content index value, and if the resource file corresponding to the target content index value does not exist locally, transmitting the resource acquisition request of the target resource to the resource server.

14. The cache server according to claim 13, wherein calculating the resource identification information included in the resource acquisition request by using the first preset algorithm to obtain the target feature index value further includes:
  if the resource identification information included in the resource acquisition request matches a locally pre-stored target information format, extracting feature information in the resource identification information according to the locally pre-stored target information format, and calculating the feature information by using the first preset algorithm to obtain the target feature index value; and
  if the resource identification information included in the resource acquisition request does not match any locally pre-stored information format, calculating the resource identification information included in the resource acquisition request by using the first preset algorithm to obtain the target feature index value.

15. The cache server according to claim 13, wherein transmitting the data acquisition request of the specified segment of the target resource to the resource server of the target resource further includes:
  if a data size of a resource file of the target resource is larger than a data size of the specified segment, transmitting the data acquisition request of the specified segment of the target resource to the resource server of the target resource, and if the data size of the resource file of the target resource is not larger than the data size of the specified segment, transmitting the resource acquisition request of the target resource to the resource server.

16. The cache server according to claim 13, wherein calculating the data of the specified segment by using the second preset algorithm to obtain the target content index value further includes:
  obtaining a data size of the whole resource of the target resource, and combining the data size of the whole resource of the target resource to calculate the data of the specified segment by using the second preset algorithm to obtain the target content index value.

17. The cache server according to claim 13, wherein:
  the resource acquisition request includes identifiers for target data segments; and
  if the resource file corresponding to the target content index value exists locally, feeding back the resource file corresponding to the target content index value further includes:
  if the resource file corresponding to the target content index value exists locally, and the resource file includes all resource data to which the identifiers of the target data segments are directed, feeding back all the resource data, in the resource file, to which the identifiers of the target data segments are directed, and
  if the resource file corresponding to the target content index value exists locally, and the resource file does not include all the resource data to which the identifiers of the target data segments are directed, transmitting the resource acquisition request of the target resource to the resource server.

18. The cache server according to claim 13, after transmitting the resource acquisition request of the target resource to the resource server, the method further includes:
  receiving a resource file of the target resource fed back by the resource server, and correspondingly storing the target feature index value, the target content index value, and the resource file in the local.

* * * * *